(12) United States Patent
Boutros et al.

(10) Patent No.: US 12,452,168 B2
(45) Date of Patent: Oct. 21, 2025

(54) SIMPLIFICATION OF LAYER 2 VPLS CONTROL PLANE

(71) Applicant: Ciena Corporation

(72) Inventors: Sami Boutros, Union City, CA (US); Muthurajah Sivabalan, Ottawa (CA); David Henry Gilson, Honolulu, HI (US); Tao Wang, Ottawa (CA); Martin Pepin, Gatineau (CA)

(73) Assignee: Ciena Corporation, Hanover, MD (US)

( * ) Notice: Subject to any disclaimer, the term of this patent is extended or adjusted under 35 U.S.C. 154(b) by 405 days.

(21) Appl. No.: 18/160,351

(22) Filed: Jan. 27, 2023

(65) Prior Publication Data

US 2024/0259306 A1 Aug. 1, 2024

(51) Int. Cl.
*H04L 45/00* (2022.01)
*H04L 12/46* (2006.01)

(52) U.S. Cl.
CPC .......... *H04L 45/66* (2013.01); *H04L 12/4645* (2013.01)

(58) Field of Classification Search
CPC ... H04L 45/66; H04L 12/4645; H04L 12/467; H04L 12/4675; H04L 12/4641; H04L 45/04; H04L 45/50
See application file for complete search history.

(56) References Cited

U.S. PATENT DOCUMENTS

| | | | |
|---|---|---|---|
| 1,023,763 A * | 4/1912 | Name not available | D04B 11/00 66/89 |
| 7,120,792 B1 | 10/2006 | Jacobson et al. | |
| 7,197,573 B1 | 3/2007 | Jacobson et al. | |
| 7,430,176 B2 | 9/2008 | Nalawade et al. | |
| 7,539,191 B1 | 5/2009 | Jacobson | |
| 7,684,351 B2 | 3/2010 | Vasseur et al. | |
| 8,135,834 B1 | 3/2012 | Jacobson et al. | |
| 8,274,901 B1 | 9/2012 | Casner et al. | |
| 8,422,502 B1 | 4/2013 | Alaettinoglu et al. | |
| 8,724,629 B1 * | 5/2014 | Goli | H04L 45/50 370/392 |

(Continued)

FOREIGN PATENT DOCUMENTS

| | | |
|---|---|---|
| EP | 3 038 301 B1 | 3/2020 |
| WO | 2021/0967231 A1 | 4/2021 |

OTHER PUBLICATIONS

May 21, 2026 International Search Report and Written Opinion for International Patent Application No. PCT/US2024/012865.

*Primary Examiner* — Kibrom T Hailu
(74) *Attorney, Agent, or Firm* — Baratta Law PLLC; Lawrence A. Baratta, Jr.

(57) ABSTRACT

A Provider Edge (PE) node is configured to provide a Layer 2 Virtual Private Local Area Network (LAN) service (VPLS) having a simplified control plane. The PE node includes circuitry configured to receive a packet from a second PE node in the network, wherein the packet includes (1) a Destination Media Access Control (MAC) address associated with a destination Customer Edge (CE) node, (2) a source MAC address associated with a source CE node, and (3) a Virtual Local Area Network (VLAN) Identifier used to represent one of the second PE node and a multi-home configuration including the second PE node, and learn the source MAC address associated with the source CE node as being reachable via the one of the second PE node and the multihome configuration.

20 Claims, 2 Drawing Sheets

(56) References Cited

U.S. PATENT DOCUMENTS

| | | | |
|---|---|---|---|
| 8,824,331 B1 | 9/2014 | Alaettinoglu et al. | |
| 8,937,946 B1 | 1/2015 | Kanna et al. | |
| 8,953,590 B1* | 2/2015 | Aggarwal | H04L 12/4675 |
| | | | 370/409 |
| 9,019,973 B1* | 4/2015 | Shukla | H04L 45/66 |
| | | | 370/395.31 |
| 9,100,213 B1 | 8/2015 | Ramanathan et al. | |
| 9,832,097 B2* | 11/2017 | Balus | H04L 45/00 |
| 9,979,629 B2 | 5/2018 | Sivabalan et al. | |
| 10,033,623 B2 | 7/2018 | Jain et al. | |
| 10,116,464 B2* | 10/2018 | Lin | H04L 45/66 |
| 10,158,558 B1 | 12/2018 | Ward et al. | |
| 10,165,093 B2 | 12/2018 | Filsfils et al. | |
| 10,171,338 B2 | 1/2019 | Filsfils et al. | |
| 10,250,494 B2 | 4/2019 | Sivabalan et al. | |
| 10,277,558 B2 | 4/2019 | Khan et al. | |
| 10,291,516 B2 | 5/2019 | Bryant et al. | |
| 10,454,821 B2 | 10/2019 | Filsfils et al. | |
| 10,567,295 B2 | 2/2020 | Barton et al. | |
| 10,740,408 B2 | 8/2020 | Ramasamy et al. | |
| 10,833,976 B2 | 11/2020 | Saad et al. | |
| 10,868,755 B2 | 12/2020 | Filsfils et al. | |
| 11,057,243 B2* | 7/2021 | Bickhart | H04L 12/4641 |
| 11,057,278 B1 | 7/2021 | Côté et al. | |
| 2014/0294004 A1* | 10/2014 | Balus | H04L 12/4641 |
| | | | 370/390 |
| 2015/0271034 A1 | 9/2015 | Kanna et al. | |
| 2016/0057049 A1 | 2/2016 | Jacobson et al. | |
| 2016/0191324 A1 | 6/2016 | Olofsson et al. | |
| 2019/0245779 A1* | 8/2019 | Jonnalagadda | H04L 45/22 |
| 2019/0297017 A1 | 9/2019 | Pignataro et al. | |
| 2019/0379601 A1 | 12/2019 | Khan et al. | |
| 2020/0112495 A1 | 4/2020 | Attarwala et al. | |
| 2020/0153856 A1 | 5/2020 | Nainar et al. | |
| 2020/0220811 A1 | 7/2020 | Shah | |
| 2021/0092043 A1 | 3/2021 | Filsfils et al. | |
| 2021/0160174 A1 | 5/2021 | Kashyap et al. | |
| 2021/0243095 A1 | 8/2021 | Attarwala et al. | |
| 2021/0352007 A1 | 11/2021 | Boutros et al. | |
| 2022/0131721 A1* | 4/2022 | Boutros | H04L 12/4633 |
| 2022/0200903 A1* | 6/2022 | Boutros | H04L 45/50 |
| 2022/0337517 A1* | 10/2022 | Boutros | H04L 61/103 |

\* cited by examiner

SIMPLIFICATION OF LAYER 2 VPLS CONTROL PLANE

FIELD OF THE DISCLOSURE

The present disclosure relates generally to networking and computing. More particularly, the present disclosure relates to systems and methods for simplification of a Layer 2 Virtual Private Local Area Network (LAN) service (VPLS) control plane.

BACKGROUND OF THE DISCLOSURE

A VPLS is a technique to provide multipoint-to-multipoint (mp2mp) Ethernet connectivity. VPLS emulates a LAN, via full mesh connectivity between Provider Edge (PE) routers. There are two approaches for full mesh establishment for VPLS: using Border Gateway Protocol (BGP) and using Label Distribution Protocol (LDP), and these are described in RFC 4761, "Virtual Private LAN Service (VPLS) Using BGP for Auto-Discovery and Signaling," January 2007, and RFC 4762, "Virtual Private LAN Service (VPLS) Using Label Distribution Protocol (LDP) Signaling," January 2007. The control plane (i.e., BGP or LDP) is how the PE routers communicate for auto-discovery and signaling. Auto-discovery refers to the process of finding other PE routers participating in the same VPN or VPLS. Signaling is the process of establishing pseudowires (PW) or tunnels. The PWs/tunnels are the data plane where PEs send customer VPN/VPLS traffic to other PEs. BGP provides both auto-discovery and signaling. Each PE is configured to participate in a given VPLS. The PE, through the use of BGP, simultaneously discovers all other PEs in the same VPLS, and establishes a full mesh of pseudowires to those PEs. With LDP, each PE router must be configured to participate in a given VPLS, and, in addition, be given the addresses of other PEs participating in the same VPLS. A full mesh of LDP sessions is then established between these PEs. LDP is then used to create an equivalent mesh of PWs between those PEs.

Ethernet Virtual Private Network (VPN) (EVPN) is another approach to provide virtual multipoint bridged connectivity between different Layer 2 domains. EVPN is considered an improvement over VPLS with control plane Media Access Control (MAC) learning, multi-homing, load balancing, and the like. EVPN control plane MAC learning, via BGP, is used to address shortcomings in VPLS. MAC address learning is the process where other PEs learn what Customer Edge (CE) routers are locally connected to a given PE. Conventionally, MAC learning is performed in the control plane (i.e., BGP or LDP). While EVPN is an improvement over conventional VPLS, the control plane MAC learning is much slower than the fast data plane MAC learning available on switching technology today, and reacts a lot slower to MAC movement, and to network failures. BGP control plane MAC learning adds scale concerns to the network devices, as all network devices attached to the same Virtual Private Network (VPN), through BGP will learn about all the MAC addresses associated with that VPN, not only the MAC addresses their site is interested in communicating with. BGP control plane MAC learning is also more complex than data plane MAC learning because of the extra (software) signaling and state that needs to be processed.

It would be advantageous to provide VPLS with the benefits included in EVPN without the disadvantages of BGP control plane MAC learning.

BRIEF SUMMARY OF THE DISCLOSURE

The present disclosure relates to systems and methods for simplification of a Layer 2 Virtual Private Local Area Network (LAN) service (VPLS) control plane, namely a simplified VPLS scheme. Similar to EVPN, the simplified VPLS described herein uses BGP signaling to establish the VPLS service with BGP Peers to offer a multipoint-to-multipoint L2 Ethernet service for a given client. Unlike EVPN, in the simplified VPLS, learning the Internet Protocol (IP) and MAC address binding of the locally connected CEs occurs in data plane not in control plane, bringing the data plane learning benefit of scale, fast convergence, and conversational learning. The simplified VPLS scheme does not take away the most liked benefits of EVPN such as support of multi-active redundancy on access, multipathing in the core, auto-provisioning, and auto-discovery.

In an embodiment, a Provider Edge (PE) node is configured to provide a Layer 2 Virtual Private Local Area Network (LAN) service (VPLS), with a simplified control plane. The PE node includes circuitry configured to receive a packet from a second PE node in the network, wherein the packet includes (1) a Destination Media Access Control (MAC) address associated with a destination Customer Edge (CE) node, (2) a source MAC address associated with a source CE node, and (3) a Virtual Local Area Network (VLAN) Identifier used to represent one of the second PE node and a multihome configuration including the second PE node, and learn the source MAC address associated with the source CE node as being reachable via the one of the second PE node and the multihome configuration.

The packet can further include a service label that identifies the VPLS. The circuitry can be further configured to advertise, via Border Gateway Protocol (BGP) and to all other PE nodes in the network, the VPLS as being locally configured on the PE node. The circuitry can be further configured to advertise, via Border Gateway Protocol (BGP) and to all other PE nodes in the network, the VPLS and a plurality of additional VPLS being locally configured on the PE node, wherein the advertise utilizes a bitmap such that each bit in the bitmap represents a single VPLS.

The circuitry can be further configured to transmit a second packet to a third PE node in the network, wherein the second packet includes (1) a second Destination MAC address associated with a second destination CE node, (2) a source MAC address associated with a second source CE node, and (3) a second Virtual Local Area Network (VLAN) Identifier used to represent one of the PE node and a second multihome configuration including the PE node. The second packet can further include (4) a transport label that identifies an egress endpoint. To learn the source MAC address, the circuitry can be further configured to implement a loopback logical port for a Flow Domain that represents the VPLS in the PE node, and use the loopback logical port to map Flow Points (FPs) to MAC addresses.

When the source CE node is single homed, the VLAN ID can be a unique VLAN ID that identifies the second PE node, to learn the MAC address associated with the source CE node being reachable via the second PE node, and, when the source CE nodes can be in the multihome configuration, the VLAN ID is an Anycast VLAN ID that identifies the second PE node and another PE node in the multihome configuration.

In another embodiment, a method for providing a Layer 2 Virtual Private Local Area Network (LAN) service (VPLS) is implemented by a Provider Edge (PE) node in a network. The method includes steps of receiving a packet from a second PE node in the network, wherein the packet includes (1) a Destination Media Access Control (MAC) address associated with a destination Customer Edge (CE) node, (2) a source MAC address associated with a source CE node, and (3) a Virtual Local Area Network (VLAN) Identifier used to represent one of the second PE node and a multihome configuration including the second PE node; and learning the source MAC address associated with the source CE node as being reachable via the one of the second PE node and the multihome configuration.

The packet cam further include a service label that identifies the VPLS. The steps can further include advertising, via Border Gateway Protocol (BGP) and to all other PE nodes in the network, the VPLS as being locally configured on the PE node. The steps can further include advertising, via Border Gateway Protocol (BGP) and to all other PE nodes in the network, the VPLS and a plurality of additional VPLS being locally configured on the PE node, wherein the advertise utilizes a bitmap such that each bit in the bitmap represents a single VPLS.

The steps can further include transmitting a second packet to a third PE node in the network, wherein the second packet includes (1) a second Destination MAC address associated with a second destination CE node, (2) a second source MAC address associated with a second source CE node, and (3) a second Virtual Local Area Network (VLAN) Identifier used to represent one of the PE node and a second multi-home configuration including the PE node. The second packet can further include (4) a transport label that identifies an egress endpoint.

To learn the source MAC address, the steps can further include implementing a loopback logical port for a Flow Domain that represents the VPLS in the PE node, and use the loopback logical port to map Flow Points (FPs) to MAC addresses. When the source CE node is single homed, the VLAN ID can be a unique VLAN ID that identifies the second PE node, to learn the MAC address associated with the source CE node being reachable via the second PE node, and, when the source CE nodes is in the multihome configuration, the VLAN ID can be an Anycast VLAN ID that identifies the second PE node and another PE node in the multihome configuration.

In a further embodiment, a non-transitory computer-readable medium includes instructions that are executable by a Provider Edge (PE) node to implement the steps associated with the aforementioned method.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for simplification of a Layer 2 Virtual Private Local Area Network (LAN) service (VPLS) control plane, namely a simplified VPLS scheme. Similar to EVPN, the simplified VPLS described herein uses BGP signaling to establish the VPLS service with BGP Peers to offer a multipoint-to-multipoint L2 Ethernet service for a given client. Unlike EVPN, in the simplified VPLS, learning the Internet Protocol (IP) and MAC address binding of the locally connected CEs occurs in data plane not in control plane, bringing the data plane learning benefit of scale, fast convergence, and conversational learning. The simplified VPLS scheme does not take away the most liked benefits of EVPN such as support of multi-active redundancy on access, multipathing in the core, auto-provisioning, and auto-discovery.

The simplified VPLS includes
(1) use of a global identifier (ID) to identify a VPLS configured on all the PEs members,
(2) distribution of global IDs of all locally configured VPLS services as a bitmap in a BGP message distributed between PEs, and a global node ID encoded as a VLAN identifier (VLAN ID or VID) in the packet, for data plane MAC learning,
(3) For each multi-homed site (MH) (identified by Ethernet Segment (ES)), another global node ID is distributed by the PEs attached to the site, one global node ID per MH site encoded as a VLAN ID in the packet,
(4) The Global node ID is unique networkwide and can be a Segment Routing ID offset if Segment routing is in use, or else this Global 12- or 24-bits node ID need to be provisioned if other transport (like LDP or BGP) is in use, and
(5) EVPN mechanisms for segment route RT-4 can be used for performing DF election for BUM traffic.

The simplified VPLS utilizes MAC learning against VLAN ID that corresponds to a global node ID for a remote PE or for a remote MH site. For outgoing packets [From local PE to remote PE], the use of global node ID one per remote MH Ethernet Segment or per remote PE is mapped to a transport nexthop label reachable by any of the PEs attached to the MH site or the remote PE. The PEs attached to the MH site, will have to have an anycast IP per MH site for transport business. Benefits of the simplified VPLS include
(1) Gain back MAC learning via the data plane over the control plane, such as fast convergence and scale through conversational learning,
(2) Use of a global node ID per MH site reachable via an anycast IP, maintaining the benefit of A/A multihoming, multipathing offered by EVPN,
(3) Unlike EVPN in an Active/Active (A/A) scenario, where on peer nexthop down, the underlay network convergence, i.e., detection will happen first, then EVPN Layer2/3 convergence occurs by switching the EVPN routes from the down nexthop to the remaining nexthops, with the new scheme through the use of anycast IP; only the underlay network convergence is needed, and
(4) Maintain auto-discovery, single side provisioning of the service.

Figure 1:
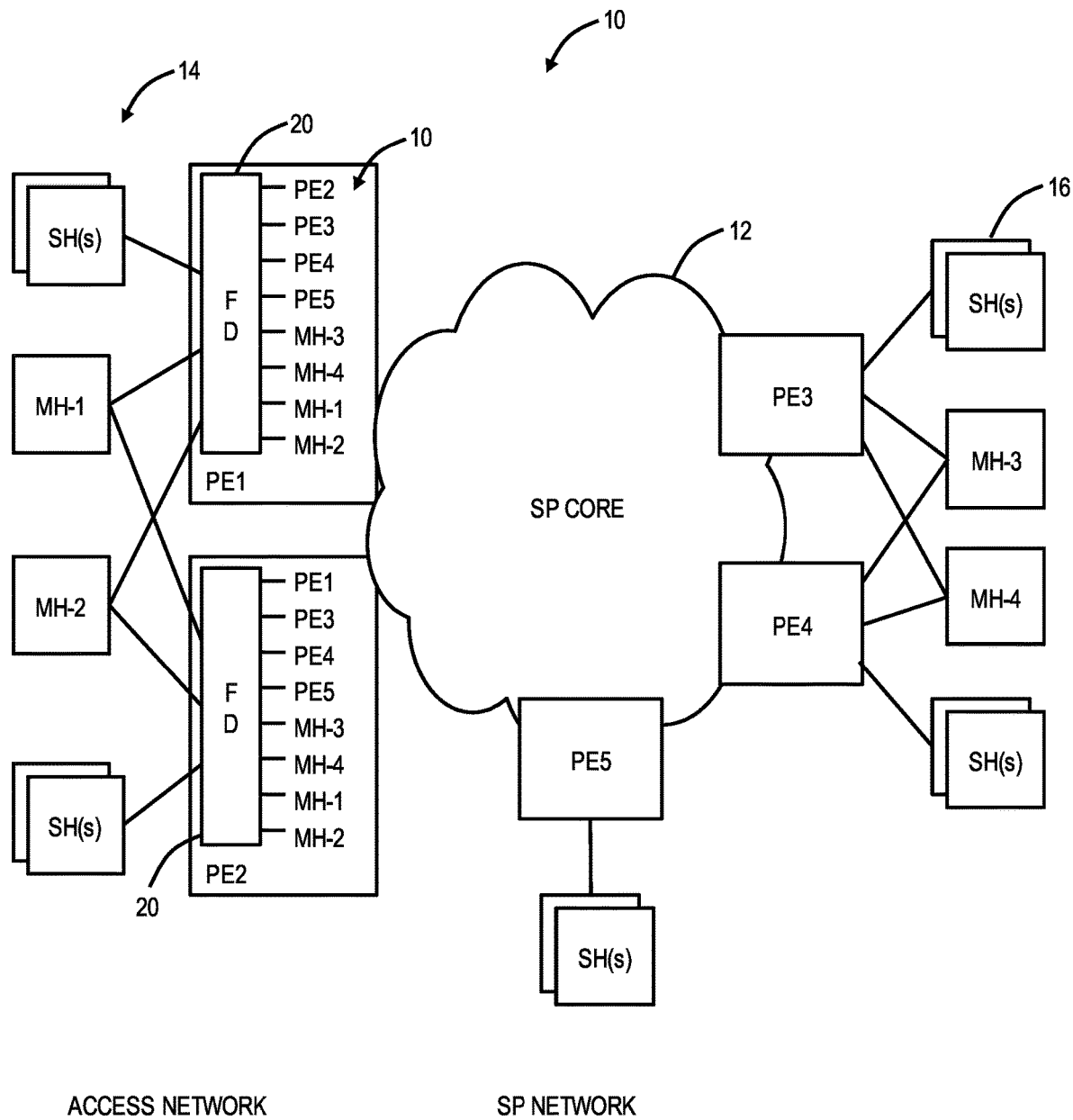
FIG. 1 is a network diagram of a network for illustrating a simplified VPLS service.

Acronyms
mp2mp—Multipoint-to-Multipoint
A/A—Active/Active used synonymously with multi-active when CE is multi-homed to more than 2 Pes
BUM—Broadcast, Unknown and Multicast
DP—Data Path
DF—Designated Forwarder. DF algorithm is used on MH peers to elect DF for each VLAN
EVPN—Ethernet VPN
EVI—Ethernet VPN Instance
ES—Ethernet Segment. When CE is MH to PEs via LAG, MH peers identify LAG interface as Ethernet Segment FD—Forwarding Domain or Flow Domain
FP—Flow Point or attachment circuit, a circuit connecting to a customer network between PE and CE, for example.
LB—Loopback
MH—Multihome
PE—Provider Edge
PW—Pseudowire
RT—Route Target. EVPN uses BGP RTs with import/export policy to form EVI member group
SH—Single homed (SH can also refer to Split Horizon)
SID—Segment ID
SP—Service Provider
VPLS—Virtual Private LAN Service
VPWS—Virtual Private Wire Service Example Network FIG. 1 is a network diagram of a network 10 for illustrating a simplified VPLS service. The network 10 includes a Service Provider (SP) core network 12 with five example PE nodes, PE1, PE2, PE3, PE4, PE5. There are various CE nodes in an access network 14 that connect to corresponding PE nodes. The CE nodes are either single homed (SH) nodes 16 or multihomed nodes, MH-1, MH-2, MH-3, MH-4. The CE nodes can be hosts, routers, switches, etc. and include MAC addresses that need to be learned against the corresponding PE node. For illustration purposes, the PE nodes PE1, PE2 are expanded; those skilled in the art will appreciate there are also similar functions at the PE3, PE4, PE5 although not shown for simplicity of illustration. Also, those skilled in the art will appreciate the network 10 is an example with relatively few PE nodes and CE nodes, again for ease of illustration. Other embodiments are also contemplated with more or less nodes.

The PE nodes PE1, PE2 include a Forwarding Domain (FD) 20 which includes the functionality of a Layer 2 service instance inside the PE node. That is the FD includes all configuration, switching functionality, connectivity, etc. inside the PE node to support the Layer 2 service, i.e., a simplified VPLS service between the PE nodes PE1, PE2, PE3, PE4, PE5. The term "FD" can be used interchangeably with Layer 2 service instance, VPLS instance, simplified VPLS instance, etc. The term "FD" can also be used interchangeably with the term Flow Domain from the Metro Ethernet Forum (MEF).

There are various Flow Points (FPs) 22 attached to the FD 20. In the MEF, a FP is a reference to point on functional components of the network 10. The FPs 22 include Attachment Circuits (ACs) to the SH nodes 16 and the attached multihomed nodes. The FPs 22 also include virtual links or virtual ACs to other PE nodes in the network 10.

The present disclosure includes a service label in packets that ingress or egress the FD 20 with the service label identifying the VPLS, i.e., the service label is the global ID mentioned above, to identify the VPLS configured on all the PEs members. Additionally, packets also include a VLAN ID to identify the FP 22, for use in data plane MAC learning, namely to learn CE MAC addresses based on their corresponding PE node or PE nodes in a multihome configuration. The global ID identifies the simplified VPLS, and the global node ID (VLAN ID) identifies the PE node. The global ID can be a Segment Identifier (SID), if the SP core network 12 utilizes Segment Routing (SR). Alternatively, of the SP core network 12 does not use SR, in favor of another underlay technology (e.g., MPLS), the global ID can be some unique networkwide value that can either be distributed by LDP or BGP or provisioned.

Assume a loopback logical port per FD 20 that can be used to support data plane MAC learning as described herein. On this loopback logical port, there will be FPs 22. Each FP decapsulated VLAN ID will identify a source PE node or a Multi home site attached to more than one PE node, such as an anycast VLAN ID. All ports on this FD 20, as part of ingress processing, will add:

(1) a Local PE VLAN ID for packets coming from single home sites 16.
(2) an anycast VLAN ID for packets coming from a multihome site.

For an ingress packet, the incoming service label will identify the per FD 20 loopback logical port. The underneath VLAN ID will identify the FP 22 on the loopback logical port.

When sending packets out on any FP on this loopback logical port, packets will egress the FP 22 from where the MAC address was learned on this loopback. This FP 22 being associated with FD 20 will add the appropriate service label (as defined herein) and additionally add any necessary transport labels for the corresponding underlay dependent on the underlay technology.

The incoming service label can be derived from the global ID advertised by BGP. A different Incoming service label for received BUM traffic for a given FD 20 can be derived from the global ID advertised by BGP. VLAN ID and Anycast VLAN ID can be derived from the global node ID that identifies a remote PE node or a remote MH site advertised by BGP.

Example Packets

The following sections illustrate example packet formats for the simplified VPLS service. Of note, the destination and source MAC addresses in each represent destination and source MAC addresses of the CE nodes in the access network 14. The present disclosure adds the source PE VLAN ID (for single homed CE nodes) and the Anycast VLAN ID (for multihomed CE nodes) so that a receiving PE node can perform data plane MAC learning of the MAC address to PE node (or multihomed PE node). To that end, VLAN IDs are added to uniquely identify PE nodes or Anycast Rx Unicast Packets from Single and Multihome from the SP Core Network to the Access Network The following table illustrates a Rx unicast packet.

| Service Label | Destination MAC | Source MAC | Source PE or Anycast VLAN ID | Layer 3 packet |
|---|---|---|---|---|
| | | ← Layer 2 payload → | | |

The service label is the global ID for the VPLS service and this is mapped to a logical FD port. The underneath VLAN ID is used to identify the FP 22, either a source PE node or multihome PE nodes via an Anycast ID to match a FP that identifies the source PE or MH site for MAC learning.

Tx Unicast Packets from Single Home from the Access Network to the SP Core Network The following table illustrates a Tx unicast packet.

| Transport Label | Service Label | Destination MAC | Source MAC | Source PE or Anycast VLAN ID | Layer 3 packet |
|---|---|---|---|---|---|
| | | | ← Layer 2 payload → | | |

There is a MAC address lookup in the FD 20 to find an FP 22. The incoming FP encapsulates the local PE global node ID (i.e., VLAN ID). As the packets egress the FP 22 from where the MAC addressed learned on the loopback logical port, which is treated as a cross-connect to add the global ID (service label) and transport label (transport tunnel info).

Tx Unicast Packets from Multihome from the Access Network to the SP Core Network The following table illustrates a Tx unicast packet from a multihome.

| Transport Label | Service Label | Destination MAC | Source MAC | Anycast VLAN ID | Layer 3 packet |
|---|---|---|---|---|---|
| | | ← Layer 2 payload → | | | |

There is a MAC address lookup in the FD 20 to find an FP 22. As the packets egress the FP 22 from where the MAC addressed learned on the loopback logical port, which is treated as a cross-connect to add the global ID (service label) and transport label (transport tunnel info). The incoming FP 22 attached to the MH site, encapsulates the MH site global node ID (i.e., Anycast VLAN ID).

Flood Replication, Split Horizon and DF Election

Flood Replication, Split Horizon, and Designated Forwarder (DF) election are the same as EVPN VPLS. There are a list of service tunnels to the different PEs using the derived service labels for BUM traffic. A flooded received packet should only be forwarded to FPs 22 on MH ports that are DF only. A Split Horizon label can be an Anycast VLAN ID, derived from the global node ID for MH site, can filter packet to a DF FP if it matches the port SH label.

There can be another approach for Split Horizon with no Split Horizon label added. For Packets arriving on the FP 22 matching an anycast VLAN ID, packets are not replicated to the FD FP, if the anycast VLAN ID is associated with the FP port attached to a MH site.

Bitmap

As described herein, a bitmap is a sequence of bits (that have values of 0 or 1). To optimize advertisement of the global IDs, a bitmap can be used in a BGP message distributed between PE nodes. Again, each global ID represents a VPLS. A given PE node can advertise its locally configured VPLS as follows. First, the bitmap can include a designated, pre-known starting VPLS that is represented by the first bit in the bitmap. For example, for simplicity, assume the first VPLS has a global ID of 1. The first bit in the bitmap can either be 0 (the VPLS instance with a global ID of 1 is not configured at this PE node) or 1 (the VPLS with a global ID of 1 is configured at this PE node). Each subsequent bit in the bitmap can represent another VPLS in some order (e.g., sequential). For example, the second bit in the bitmap can represent the VPLS with a global ID of 2, the third bit can represent the VPLS instance with a global ID of 3, etc. Of course, the staring global ID can be any value (not just 1). Also, the sequence can be something other than 1 as long as all PE nodes are aware of the values of each subsequent bit.

Advantageously, this bitmap approach can allow a single BGP message to advertise hundreds or thousands of VPLS services and their global IDs and their support at a given PE node.

Process for Simplification of a L2 VPLS Control Plane

Figure 2:
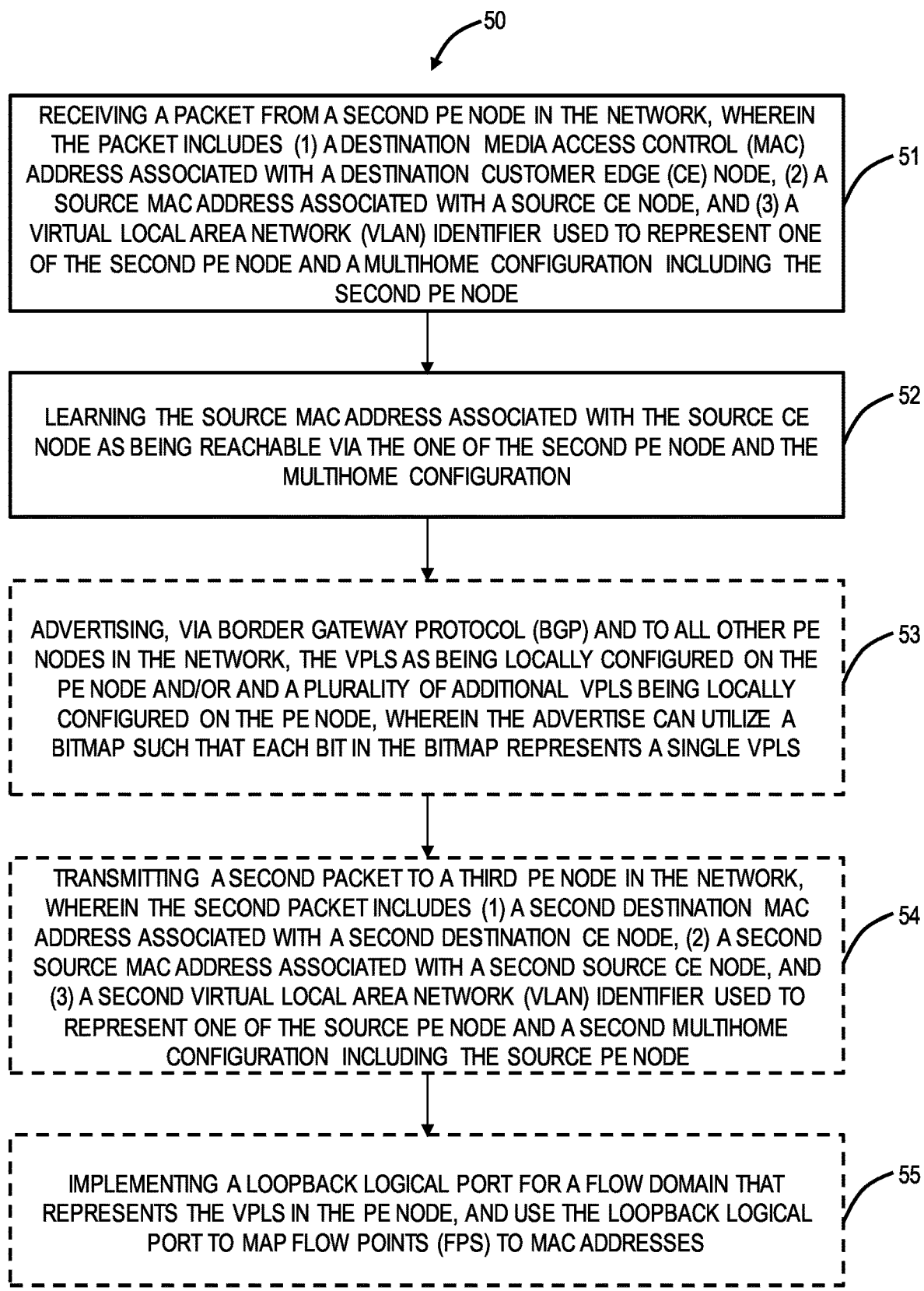
FIG. 2 is a flowchart of a process for simplification of a Layer 2 Virtual Private Local Area Network (LAN) service (VPLS) service control plane.

FIG. 2 is a flowchart of a process 50 for simplification of a Layer 2 Virtual Private Local Area Network (LAN) service (VPLS) service control plane. The process 50 can be implemented as a method having steps and the method can be performed by a PE node, via a PE node having circuitry configured to implement the steps, and via non-transitory computer-readable medium with instructions that are executable by a PE node to implement the steps.

The process 50 includes receiving a packet from a second PE node in the network, wherein the packet includes (1) a Destination Media Access Control (MAC) address associated with a destination Customer Edge (CE) node, (2) a source MAC address associated with a source CE node, and (3) a Virtual Local Area Network (VLAN) Identifier used to represent one of the second PE node and a multihome configuration including the second PE node (step 51); and learning the source MAC address associated with the source CE node as being reachable via the one of the second PE node and the multihome configuration (step 52).

The packet can further include a service label that identifies the VPLS. The process 50 can further include (i) advertising, via Border Gateway Protocol (BGP) and to all other PE nodes in the network, the VPLS as being locally configured on the PE node, or (ii) advertising, via Border Gateway Protocol (BGP) and to all other PE nodes in the network, the VPLS and a plurality of additional VPLS being locally configured on the PE node, wherein the advertising utilizes a bitmap such that each bit in the bitmap represents a single VPLS (step 53). The advertising via BGP includes associating VLAN ID used to represent one of the PE node and a multihome configuration including the PE node. The advertisement also includes the PE IP or anycast IP associated with the VLAN ID of the PE or the anycast VLANID associated with the multihome configuration including the PE. The other PEs of the VPLS, receiving such advertisements will make use of the PE's VLAN ID and transport label association when packet forwarding decisions are made by other PEs to the PE's VLAN ID and therefore using the associated transport label as the tunnel egress endpoint for single home, or to one of the egress points in case of multihome.

The process 50 can further include transmitting a second packet to a third PE node in the network, wherein the second packet includes (1) a second Destination MAC address associated with a second destination CE node, (2) a second source MAC address associated with a second source CE node, and (3) a second Virtual Local Area Network (VLAN) Identifier used to represent one of the PE node and a second multihome configuration including the PE node (step 54). The second packet can further include (4) a transport label that identifies an egress endpoint. The transport label is utilized in the network to transport the packet to the egress endpoint, i.e., the third PE.

The process 50 can further include, to learn the source MAC address, implementing a loopback logical port for a Flow Domain that represents the VPLS in the PE node, and use the loopback logical port to map Flow Points (FPs) to MAC addresses (step 55).

When the source CE node is single homed, the VLAN ID is a unique VLAN ID that identifies the second (i.e., the source) PE node, to learn the MAC address of the source CE node being able via the second PE node, and, when the source CE nodes is in the multihome configuration, the VLAN ID is an Anycast VLAN ID that identifies the second PE node and other PE nodes in the multihome configuration.

In the various embodiments described herein, the source PE for a packet is designated via a single VLAN ID, either a VLAN ID unique to a PE or an Anycast VLAN ID for multihoming. The present disclosure describes a novel use of existing VLAN IDs, namely to identify a source PE for purposes of data plane MAC learning. Those skilled in the art will recognize there may be situations where two or more VLAN IDS are used to uniquely identify a PE node or multihome configuration. There can also be techniques for how to make a decision on which VLAN ID to use, e.g., negotiation such as via protocols, globally-configured per node, per-BGP peer configured, etc.

Conclusion

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A Provider Edge (PE) node configured to provide a Layer 2 Virtual Private Local Area Network (LAN) service (VPLS), the PE node comprising circuitry configured to:
   receive a packet from a second PE node in the network, wherein the packet includes (1) a Destination Media Access Control (MAC) address associated with a destination Customer Edge (CE) node, (2) a source MAC address associated with a source CE node, and (3) a Virtual Local Area Network (VLAN) Identifier that encodes a global node ID identifying either the second PE node or an Anycast VLAN ID identifying a multihome configuration including the second PE node, and
   learn the source MAC address associated with the source CE node as being reachable via the one of the second PE node and the multihome configuration based on decoding the global node ID from the VLAN Identifier.

2. The PE node of claim 1, wherein the packet further includes a service label that identifies the VPLS.

3. The PE node of claim 2, wherein the circuitry is further configured to
   advertise, via Border Gateway Protocol (BGP) and to all other PE nodes in the network, the VPLS as being locally configured on the PE node.

4. The PE node of claim 2, wherein the circuitry is further configured to
   advertise, via Border Gateway Protocol (BGP) and to all other PE nodes in the network, the VPLS and a plurality of additional VPLS being locally configured on the PE node, wherein the advertise utilizes a bitmap such that each bit in the bitmap represents a single VPLS.

5. The PE node of claim 1, wherein the circuitry is further configured to
   transmit a second packet to a third PE node in the network, wherein the second packet includes (1) a second Destination MAC address associated with a second destination CE node, (2) a source MAC address associated with a second source CE node, and (3) a second Virtual Local Area Network (VLAN) Identifier that encodes a global node ID identifying one of the PE node and a second Anycast VLAN ID identifying a second multihome configuration including the PE node.

6. The PE node of claim 4, wherein the second packet further includes (4) a transport label that identifies an egress endpoint.

7. The PE node of claim 1, wherein, to learn the source MAC address, the circuitry is further configured to implement a loopback logical port for a Forwarding Domain that represents the VPLS in the PE node, and use the loopback logical port to map Flow Points (FPs) to MAC addresses.

8. The PE node of claim 1, wherein
   when the source CE node is single homed, the VLAN ID is a unique VLAN ID that encodes the global node ID to identify the second PE node, to learn the MAC address associated with the source CE node being reachable via the second PE node, and
   when the source CE nodes is in the multihome configuration, the VLAN ID is an Anycast VLAN ID that encodes the global node ID to identify the second PE node and another PE node in the multihome configuration.

9. A method for providing a Layer 2 Virtual Private Local Area Network (LAN) service (VPLS), the method implemented by a Provider Edge (PE) node in a network, the method comprising steps of:
   receiving a packet from a second PE node in the network, wherein the packet includes (1) a Destination Media Access Control (MAC) address associated with a destination Customer Edge (CE) node, (2) a source MAC address associated with a source CE node, and (3) a Virtual Local Area Network (VLAN) Identifier that encodes a global node ID identifying either the second PE node or an Anycast VLAN ID identifying a multihome configuration including the second PE node; and learning the source MAC address associated with the source CE node as being reachable via the one of the second PE node and the multihome configuration based on decoding the global node ID from the VLAN Identifier.

10. The method of claim 9, wherein the packet further includes a service label that identifies the VPLS.

11. The method of claim 10, wherein the steps further include advertising, via Border Gateway Protocol (BGP) and to all other PE nodes in the network, the VPLS as being locally configured on the PE node.

12. The method of claim 10, wherein the steps further include advertising, via Border Gateway Protocol (BGP) and to all other PE nodes in the network, the VPLS and a plurality of additional VPLS being locally configured on the PE node, wherein the advertise utilizes a bitmap such that each bit in the bitmap represents a single VPLS.

13. The method of claim 9, wherein the steps further include transmitting a second packet to a third PE node in the network, wherein the second packet includes (1) a second Destination MAC address associated with a second destination CE node, (2) a second source MAC address associated with a second source CE node, and (3) a second Virtual Local Area Network (VLAN) Identifier that encodes a global node ID identifying one of the PE node and a second Anycast VLAN ID identifying a second multihome configuration including the PE node.

14. The method of claim 13, wherein the second packet further includes (4) a transport label that identifies an egress endpoint.

15. The method of claim 9, wherein, to learn the source MAC address, the steps further include implementing a loopback logical port for a Forwarding Domain that represents the VPLS in the PE node, and use the loopback logical port to map MAC addresses to Flow Points (FPs).

16. The method of claim 9, wherein when the source CE node is single homed, the VLAN ID is a unique VLAN ID that encodes the global node ID to identify the second PE node, to learn the MAC address associated with the source CE node being reachable via the second PE node, and when the source CE nodes is in the multihome configuration, the VLAN ID is an Anycast VLAN ID that encodes the global node ID to identify the second PE node and another PE node in the multihome configuration.

17. A non-transitory computer-readable medium comprising instructions that are executable by a Provider Edge (PE) node, wherein the PE node is configured to provide a Layer 2 Virtual Private Local Area Network (LAN) service (VPLS), wherein the instructions cause the PE node to perform steps of:

receiving a packet from a second PE node in the network, wherein the packet includes (1) a Destination Media Access Control (MAC) address associated with a destination Customer Edge (CE) node, (2) a source MAC address associated with a source CE node, and (3) a Virtual Local Area Network (VLAN) Identifier that encodes a global node ID identifying either the second PE node or an Anycast VLAN ID identifying a multihome configuration including the second PE node, and learning the source MAC address associated with the source CE node as being reachable via the one of the second PE node and the multihome configuration based on decoding the global node ID from the VLAN Identifier.

18. The non-transitory computer-readable medium of claim 17, wherein the steps further include transmitting a second packet to a third PE node in the network, wherein the second packet includes (1) a second Destination MAC address associated with a second destination CE node, (2) a second source MAC address associated with a source CE node, and (3) a second Virtual Local Area Network (VLAN) Identifier that encodes a global node ID identifying one of the PE node and a second Anycast VLAN ID identifying a second multihome configuration including the PE node.

19. The non-transitory computer-readable medium of claim 17, wherein, to learn the source MAC address, the steps further include implementing a loopback logical port for a Forwarding Domain that represents the VPLS in the PE node, and use the loopback logical port to map MAC addresses to Flow Points (FPs).

20. The non-transitory computer-readable medium of claim 17, wherein when the source CE node is single homed, the VLAN ID is a unique VLAN ID that encodes the global node ID to identify the second PE node, to learn the MAC address associated with the source CE node being reachable via the second PE node, and when the source CE node is in the multihome configuration, the VLAN ID is an Anycast VLAN ID that encodes the global node ID to identify the second PE node and another PE node in the multihome configuration.

* * * * *